United States Patent [19]
Bruns

[11] Patent Number: 5,783,755
[45] Date of Patent: Jul. 21, 1998

[54] LIFTING DEVICE EMPLOYING AN EQUALIZER SYSTEM TO REDUCE WEIGHT MEASUREMENT ERROR

[75] Inventor: Robert W. Bruns, Sacramento, Calif.

[73] Assignee: GageTek Company, Rancho Cordova, Calif.

[21] Appl. No.: 812,995

[22] Filed: Mar. 4, 1997

[51] Int. Cl.[6] .................................................. G01L 1/00
[52] U.S. Cl. ............................... 73/862.541; 73/862.56
[58] Field of Search .................... 73/862.541, 862.56; 177/147; 187/222

[56] References Cited

U.S. PATENT DOCUMENTS

| | | | |
|---|---|---|---|
| 2,582,886 | 1/1952 | Ruge | 73/141 |
| 2,813,709 | 11/1957 | Brier | 265/42 |
| 3,433,324 | 3/1969 | McIntosh | 187/222 |
| 3,433,325 | 3/1969 | McIntosh | 187/222 |
| 4,010,825 | 3/1977 | Chelin | 187/222 |
| 4,212,360 | 7/1980 | Chesher | 177/139 |
| 5,139,101 | 8/1992 | Smith | 177/139 |
| 5,195,418 | 3/1993 | Smith | 91/31 |
| 5,287,885 | 2/1994 | Smith | 137/596.17 |
| 5,461,933 | 10/1995 | Ives et al. | 73/862.623 |

*Primary Examiner*—Ronald L. Biegel
*Attorney, Agent, or Firm*—Thomas Schneck; George B. F. Yee

[57] ABSTRACT

A lifting device that has a carriage supported by a chain which passes over a sprocket-wheel disposed to rotate about an axis and features an equalizer system that reduces variations in the measurement, by a load cell, of a load supported by the carriage. To further enhance the accuracy of the measurement, the load cell is designed to accurately measure the load placed thereon independent of the position of the load on the cell. The equalizer system consists of providing the chain and the sprocket-wheel with the dimensions necessary so that each link of the chain subtends a predetermined portion of the sprocket-wheel's circumference.

15 Claims, 5 Drawing Sheets

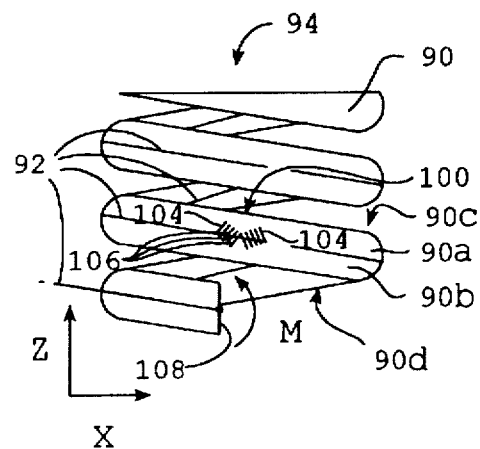
FIG. 6A
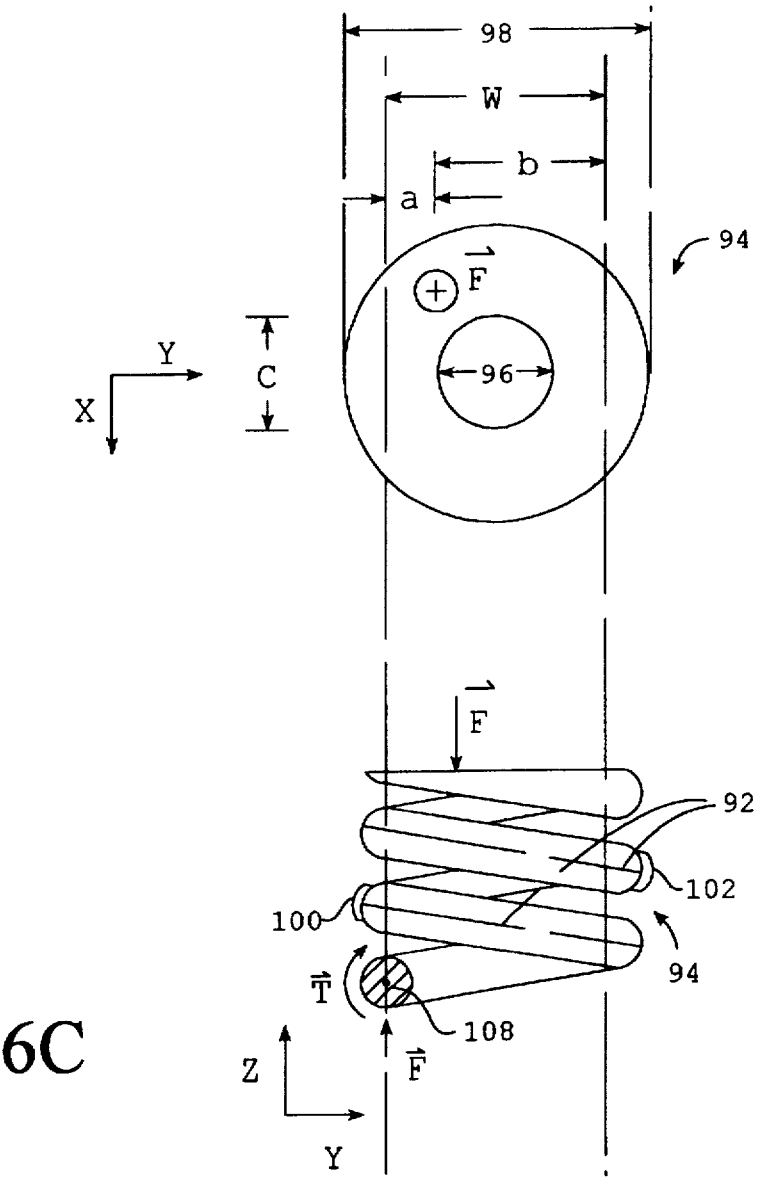
FIG. 6B
FIG. 6C

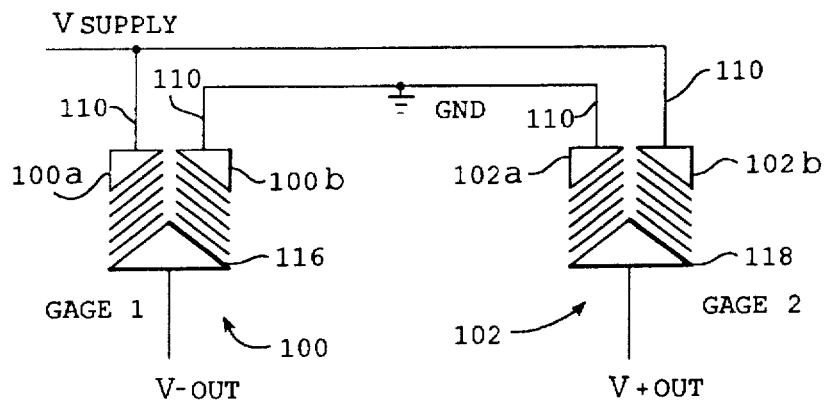
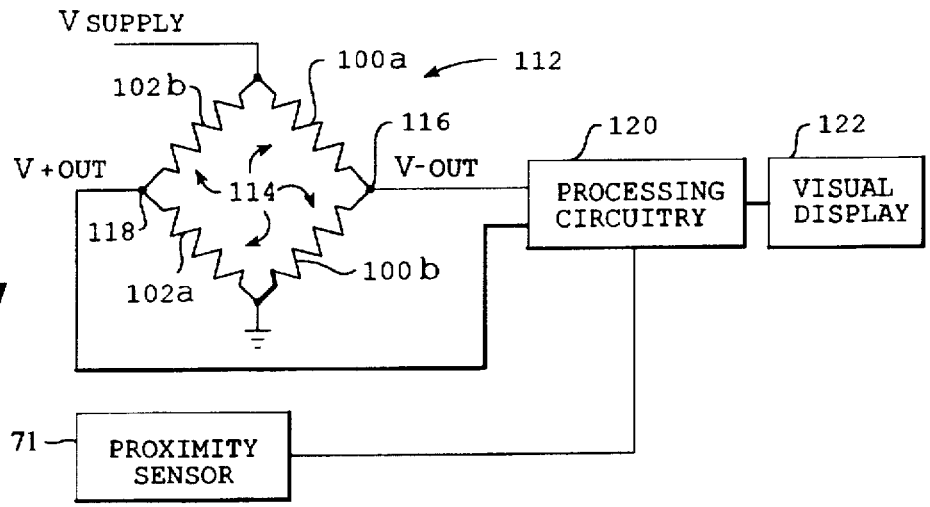
FIG. 7
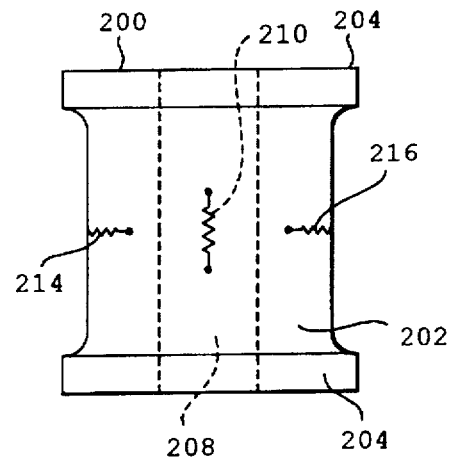
FIG. 8A
FIG. 8B
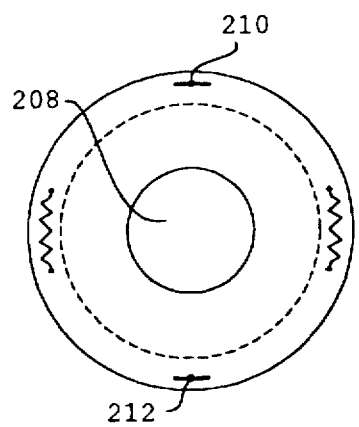

LIFTING DEVICE EMPLOYING AN EQUALIZER SYSTEM TO REDUCE WEIGHT MEASUREMENT ERROR

TECHNICAL FIELD

The present invention pertains to the field of weight sensing systems. Specifically, the present invention pertains to an equalizer system for hydraulic lifting devices that reduces weight measurement error.

BACKGROUND ART

In the past, there has been great interest in determining the load carried on trucks for hire. Loads carried by trucks are often supported by pallets, because pallets provide a stable platform on which to position and transport goods between trucks, using a hydraulic lifting device. Typically, prior art weight sensing devices were concerned with measuring the change in the gross weight of a truck to determine whether it complied with regulations relating to the loading of commercial motor vehicles and/or determining the amount to charge a customer for transportation of a particular load. This does not allow determining the weight of individual pallets of goods, before loading the pallets onto the truck, which may result in overloading of the same.

To prevent overloading of the truck, the pallets of goods may be individually transported to a scale where they are then weighed. A problem with this procedure is that it is time consuming, resulting in increased transportation costs for a given load. An obvious solution to this problem would be to provide a scale for each truck receiving a load, thereby providing dynamic weighing of the total load of the truck as pallets of goods are placed thereon. This would require having a separate scale for each truck receiving pallets of goods, or creating a queue of trucks for each scale present so that each may in turn be placed on the scale during loading. Both of these solutions result in the same drawbacks as individually weighing pallets of goods.

Prior art attempts have been made for dynamically weighing loads moved by hydraulic lifts. weigh-Tronix, Inc. describes, in a sales brochure, a device for dynamically weighing loads supported by a fork-lift. The weigh-Tronix device includes a large frame fitting between a carriage and a pair of forks. The frame is mounted parallel to the carriage and includes upper and lower plates, extending parallel to, and contiguous with, the carriage along a first direction. The plates are joined by flexible members, extending perpendicular to the first direction, parallel to the carriage. The forks are "L" shaped with a first portion mounted to the upper plate and extending parallel thereto, terminating in a lower portion, proximate to said lower plate. The lower portion extends orthogonally from the lower plate. Deflection of the flexible members is proportional to a weight disposed on the forks.

A drawback with certain prior art devices is that the weight of the devices is excessive, making it difficult to install and costly to manufacture and transport to an end user. In addition, sometimes the accuracy of prior art devices degrades over time due to fatiguing of the flexible members, which, if overload will permanently deform, making the device susceptible to premature failure.

To overcome the excessive weight of the frame, prior art devices have placed a weight transducer in the hydraulic lift circuit. In this manner, a portion of the hydraulic fluid is transmitted along a bypass from the main lift circuit. A transducer is positioned to measure the pressure of the fluid in the bypass.

U.S. Pat. Nos. 5,287,885; 5,195,418; and 5,139,101 to Smith each discloses such a bypass system. Specifically, a motion control system for hydraulically operated lifting devices is shown including, in pertinent part, a two-way valve having a normally open valve in one chamber and a normally closed valve in another chamber. The normally open valve may be closed to re-direct flow of hydraulic fluid from a main valve, under pressure from a hydraulic pump, to a bypass chamber having a flow control valve. The normally closed valve may be opened to direct flow from a lift circuit of the second flow control valve to pass the hydraulic fluid back to a hydraulic fluid reservoir tank. These bypass systems are, however, susceptible to measurement error due to vibration, shaking and pressure surges in the hydraulic fluid.

Load cells overcome the drawbacks of hydraulic bypass systems. U.S. Pat. No. 5,461,933 to Ives et al. discloses a compressive load cell having a shear web design. The load cell includes, in pertinent part, an annular body concentrically disposed about a longitudinal axis of a cylindrical body. Two pairs of flexible webs interconnect the annular body, with each web in a pair disposed opposite of the remaining web. The webs are spaced-apart, about the cylindrical body, 90° from an adjacent web. Two strain-gauges are attached to each web, on opposing surfaces. The strain-gauges are connected in a wheatstone bridge configuration, which is provided with thermally-compensating potentiometers.

U.S. Pat. No. 4,212,360 to Chesher discloses a load weighing system for a fork-lift. The system includes, in pertinent part, load cell transducers disposed to measure compressive forces exerted between a supporting chain and the anchorage of the chain. The chain supports the carriage to which lifting forks of the fork-lift are attached. The load cell transducers are formed from a spool-shaped body that has a plurality of resistive strain-gauge elements affixed to it using a suitable adhesive. The strain-gauge elements are connected in a bridge arrangement such that the degree of unbalance of the bridge is a measure of the magnitude of the compressive forces applied across the ends of the spool-shaped body.

U.S. Pat. No. 2,813,709 to Brier discloses a strain-gauge load cell that includes strain-gauges attached to suspension springs of trucks. Also included is a compensation gauge. The compensation gauge and the strain-gauges are both electronically coupled to a bridge circuit. The total impedance across the bridge circuit is affected by both the load on the strain-gauges and the temperature sensed by the compensation gauge. The compensation gauge is chosen so that the impedance across the bridge circuit is constant for a particular weight upon the strain-gauge regardless of the temperature of the surrounding atmosphere.

U.S. Pat. No. 2,582,886 to Ruge discloses a differential load device that includes a load cell having a load button. A helical compression spring is disposed around the load cell. The spring is chosen to receive a predetermined base weight, with any additional load, or differential load, being distributed between the load cell and the spring. The spring includes two strain-gauges on the outer surface of the wire that forms the spring. Typically, the spring is chosen so that its axial stiffness is relatively small, compared to that of the load cell. In this manner, the load cell is rendered extremely sensitive to any differential load that is placed on it. The two gauges allow detection of the total load on the device, i.e., the base load and the differential load.

Many of the aforementioned load cells are directed to accurate measurements of an applied load despite environ-

3 mental anomalies. Such environmental anomalies include ambient temperature fluctuations. However, the accuracy of the load measured is often degraded due to various mechanical disturbances, e.g., shaking and vibration, as well as the position of the load on the cell.

What is needed is a lifting device capable of producing a high precision weight measurement, dynamically, without degradation of the measurement's accuracy due to mechanical disturbances in the lifting device.

SUMMARY OF THE INVENTION

Disclosed is a lifting device having a carriage supported by a chain which passes over a sprocket-wheel that features an equalizer system to reduce variations in the measurement, by a load cell, of a load supported by the carriage. The chain has two spaced-apart sections that are in opposing relation, one of which is connected to the carriage, defining a load portion. The remaining section of the chain is attached to an anchor, defining an anchor portion. The invention is based upon the discovery that, for a given load, the tension to which the anchor portion is subjected differs from the tension present on the load portion. This introduces an error in the load sensed by a load cell positioned proximate to the anchor. To avoid this problem, an equalizer system is employed.

Specifically, the chain includes a plurality of links, each of which includes two rollers separated by a distance, defining a pitch P. The range of rotational movement during which load measurements are accumulated are integral multiples of 2θ, where θ is the half angle subtended by the center of the two rollers with respect to the center of the sprocket-wheel.

The equalizer system is formed by fixing the relationship between the diameter of the sprocket-wheel and the pitch P of the chain so that the chain is symmetrically disposed about the center of the sprocket-wheel.

This occurs when angle θ is divided into 180° to yield an even integer, where θ is the half angle subtended by the center of two rollers of a link in the chain and measured between two radii extending from the sprocket-wheel center. This ensures that the force on the anchor portion corresponds to the force on the load portion. Finally, the aforementioned problem may be avoided by simply moving the load cell so that it senses the tension on the load portion of the chain.

Although any load cell may be employed, it is preferred that the load cell be capable of accurately measuring the load placed thereon independent of the position of the load on the cell. To that end, the load cell includes a cylindrical wire having a neutral axis centered within the wire. The wire is helically wound to form a spring. Attached to the wire are two sets of strain-gauge elements so as to be in opposing relation at opposite sides of a diameter of the spring. Two straingauge elements are included in each set. Each strain-gauge element is symmetrically disposed about the neutral axis and includes a plurality of parallel grid elements that are oriented at a 45° angle with respect to the neutral axis. The parallel grid elements of each strain-gauge element of a given set are orientated 90° with respect to the plurality of parallel grid elements of the remaining strain-gauge element of the same set.

The strain-gauge elements are electronically connected in a wheatstone bridge configuration that includes four resistance bridges. Each strain-gauge element forms one of the resistance bridges. The two strain-gauge elements of each set have a common connection in the wheatstone bridge. Connecting the straingauge elements in this manner reduces the sensitivity of the load cell to forces applied parallel to the neutral axis.

4

BRIEF DESCRIPTION OF THE DRAWINGS

FIG. 6A is a side view of a load cell shown in FIG. 3.

FIG. 6B is a top-down view of the load cell shown in FIG. 6A demonstrating the application of a load force applied thereto.

FIG. 6C is a side view of the load cell shown in FIG. 6A, rotated 90°.

FIG. 7 is a diagram of the electrical connection of strain-gauge elements shown in FIG. 6A.

FIG. 8A is a side perspective view of a load cell shown in FIGS. 6A-C, in accord with an alternate embodiment of the present invention.

FIG. 8B is a top down view of the load cell shown in FIG. 8A.

BEST MODE FOR CARRYING OUT THE INVENTION

Figure 1:
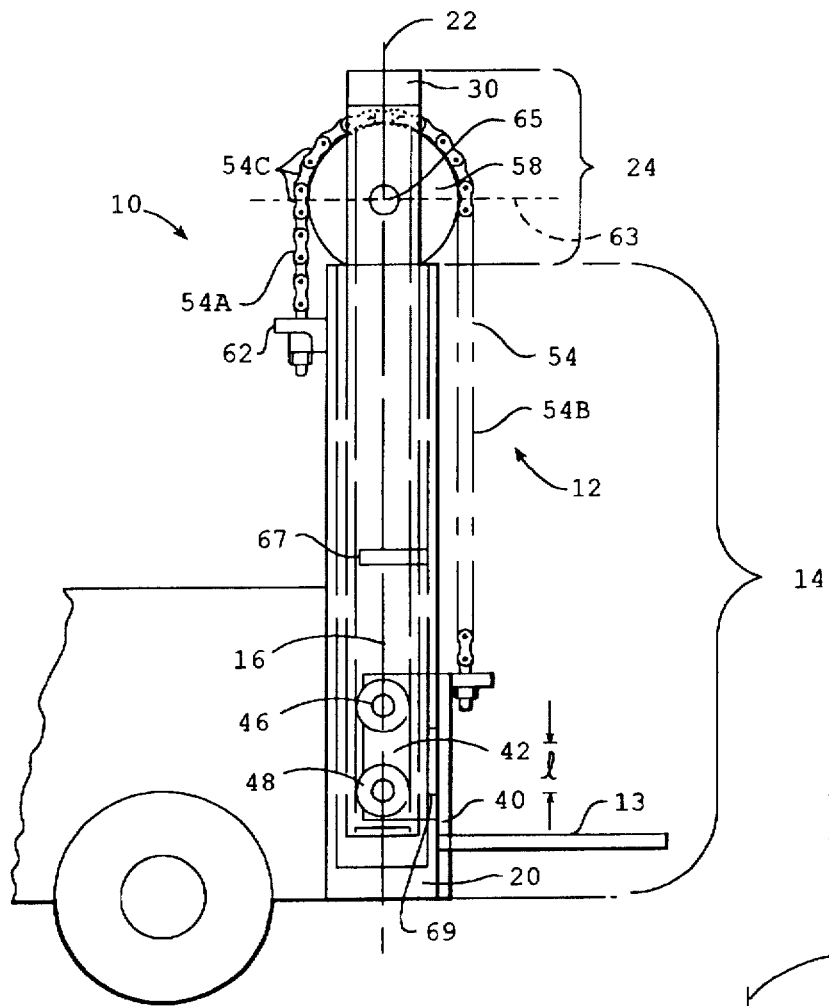
FIG. 1 is a side view of a mast for a fork-lift apparatus.
Figure 2:
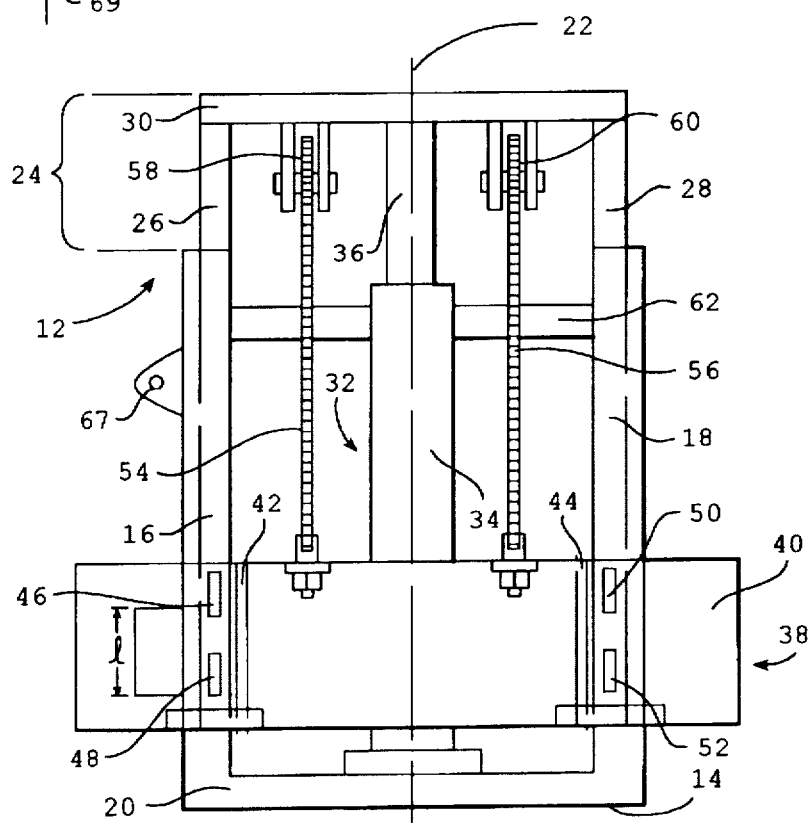
FIG. 2 is a front elevational view of the mast shown in FIG. 1.

With reference to FIGS. 1 and 2, a fork-lift truck 10 has a mast assembly 12 comprising a generally U-shaped bottom mast section 14 having a pair of spaced-apart and parallel hollow legs 16 and 18 secured to a base member 20 extending therebetween. A longitudinal axis 22 of the bottom mast section 14 is disposed substantially vertical to a chassis of the fork-lift truck 10. A top mast section 24 has an inverted U-shape and includes two spaced-apart and parallel legs 26 and 28 which are adapted to slide within the hollow legs 16 and 18, respectively, of the bottom mast section 14. A top member 30 extends between legs 27 and 28, parallel to bottom member 20. The legs 26 and 28 are also hollow and are secured to a top member 30.

A hydraulic ram 32 has a cylinder 34, mounted on the base member 20, and a piston rod 36, connected to the top member 30. The hydraulic ram 32 positions the top mast section 24, with respect to the bottom mast section 14, between extended and retracted positions. In the retracted position, the legs 26 and 28 of the top mast section 24 are wholly housed within the bottom mast section 14. In the extended position, the greater part of the legs 26 and 28 project above the top of the bottom mast section 14. In this fashion, the length of the mast 12 is varied between minimum and maximum limits.

A carriage assembly 38 includes a plate-like member 40 that extends parallel to base member 20, so that legs 16 and 18 are centered between opposed ends of the platelike member 40. Brackets 42 and 44 are secured to the member 40. Brackets 42 and 44 extend from member 40 in a direction transverse to base member 20, so as to be parallel to, and spaced-apart from, the legs 26 and 28. A fork B, or other load bearing member, extends from member 40, in a direction opposite to brackets 42 and 44 and opposite to transverse member 20. Mounted on the bracket 42 are rollers 46 and 48 lying within a channel of the leg 26. Similar rollers 50 and 52, mounted on the bracket 44, lie within the channel of the leg 28. The rollers 46 and 48, and 50 and 52, cooperate with the sides of the respective channels of the legs 26 and 28 to guide the carriage assembly 38 for motion parallel to the longitudinal axis 22.

Carriage support chains 54 and 56 pass over respective sprockets 58 and 60 which are journalled in trunnions attached to the top member 30. Each support chain 54 and 56 is secured, at one end, to the carriage assembly 38. The remaining end of each support chain 54 and 56 is secured to an anchor member 62. In this fashion, each chain 54 and 56 forms two spaced-apart and opposing portions, shown in FIG. 2 with respect to chain 54 as anchor portion 54a and load portion 54b. Anchor portion 54a extends from anchor member 62 and terminates proximate to longitudinal axis 22. Load portion 54b extends from carriage assembly 38 and terminates proximate to longitudinal axis 22. The anchor member 62 is attached to the bottom mast section 14, on the side opposite to the carriage assembly 38.

Figure 3:
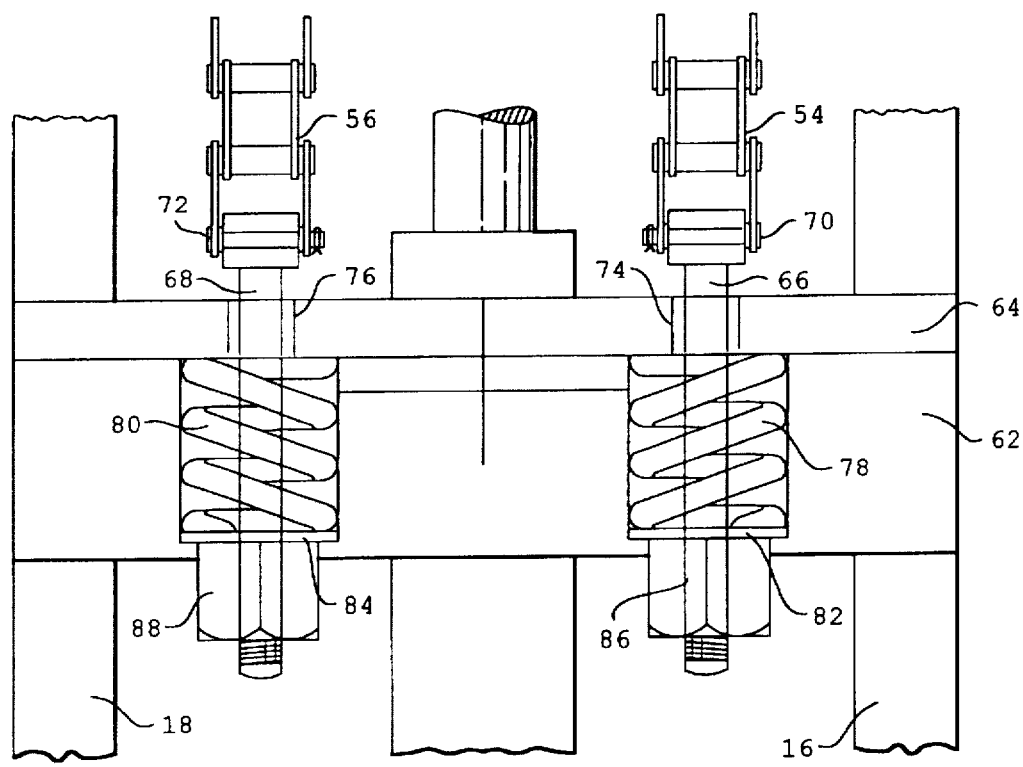
FIG. 3 is an enlarged detailed view of a chain anchorage assembly shown in FIGS. 1 and 2.

With reference to FIG. 3, the anchor member 62 comprises an L-section girder secured (e.g. by welding) to the legs 16 and 18, so that a flange 64 of the anchor member 62 projects horizontally outward past the plane of the legs 16 and 18. Eye-bolts 66 and 68 are secured to the ends of the chains 54 and 56 by respective pins 70 and 72. The shanks of the eye-bolts 66 and 68 pass through respective clearance holes 74 and 76 in the flange 64. Load cell transducers 78 and 80 are fitted over the shanks of the eye-bolts 66 and 68 between the underside of the flange 64 and respective washers 82 and 84 and retaining nuts 86 and 88. In supporting the carriage assembly 38, and any load carried on it, the pull on the chains 54 and 56 exerts compressive forces on the load cell transducers 78 and 80.

Referring to FIGS. 1–4, it was recognized that the load sensed at the load cell transducers 78 and 80 was not the actual load present on the carriage assembly 38. Upon further investigation, it was observed that the load sensed varied as a function of the relative geometry of the sprocket-wheel and the chain, which will be discussed with respect to sprocket-wheel 58 and chain 54, but applies equally with respect to sprocket-wheel 60 and chain 56. Specifically, it was discovered that the load on the anchor portion 54a differed from the load on the load portion 54b. This results from the geometry of each link that forms each chain 54 and 56. For example, chain 54 includes a plurality of links 54c, each of which includes two rollers 54d and 54e separated by a distance, defining a pitch P. As the piston 36 moves upward, a force $F_p$ is imparted upon the sprocket-wheel 58 which loads both the anchor and load portions 54a and 54b of the chain 54. The effective force, $F_{ANHOR}$, placed upon the anchor portion 54, and sensed by the load cell transducer 78, may be defined as follows:

(1) $F_{ANCHOR} = F_{LOAD}(R_L/R_A)$ where $F_{LOAD}$ is the force on the load portion 54b and $R_A$ is the distance between the center of anchor portion 54a and the axis of rotation 65 of the sprocket wheel 58, measured parallel to the axis 63. $R_L$ is the distance between the center of load portion 54b and the axis of rotation 65 of the sprocket wheel 58, measured parallel to the axis 63. Both $R_A$ and $R_L$, however, vary while the carriage 38 is moved along the mast 12 due to the geometry of the chain 34.

Figure 4:
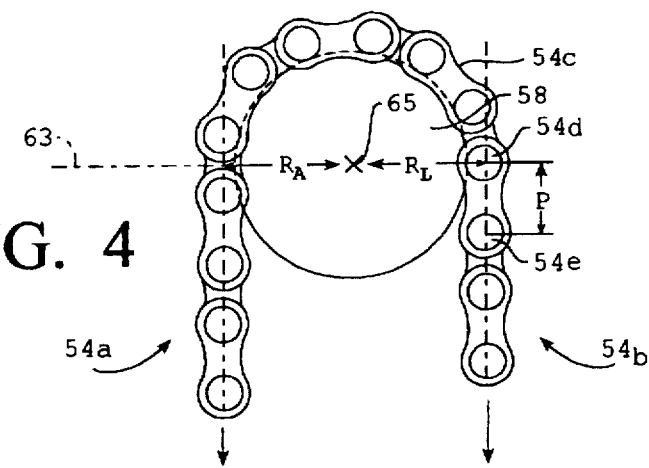
FIG. 4 is a side plan view of a sprocket-wheel and chain of the fork-lift shown in FIG. 1.
Figure 5:
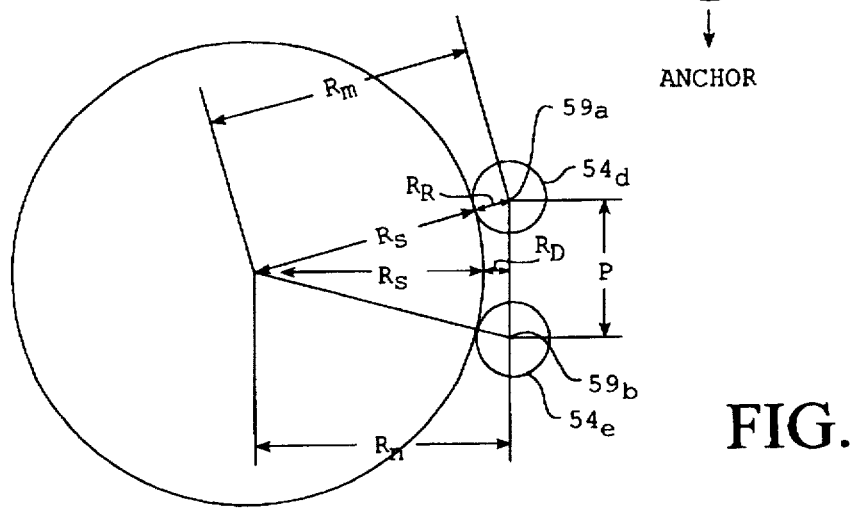
FIG. 5 is a detailed schematic view of a sprocket-wheel and a chain shown in FIGS. 1 and 4.

Referring to FIGS. 4 and 5, when one of the two rollers 54d and 54e, that form a link, lies along axis 63, either $R_A$, $R_L$ or both may be equal to the radius of sprocket wheel 58, $R_S$, plus the radius of the roller 54d or 54e, $R_R$, defining a maximum radius $R_M$. Upon axis 63 bisecting the pitch P of each link, $R_A$, $R_L$ or both may measure distance $R_N$, which is less than $R_M$, defining a minimum distance. The minimum distance $R_N$ is simply $R_S$ plus $R_D$, the distance from the center of the link to the edge of the sprocket wheel 58. As the sprocket-wheel 58 rotates about axis 65, $R_A$ and $R_L$ each moves cyclically between distances $R_M$ and $R_N$. Based upon equation (1), it can be seen that this cyclical change in measurement for $R_A$, $R_L$ causes the actual force upon anchor portion 54a to differ from the force disposed upon load portion 54b, unless $R_A$ equals $R_L$, i.e., the ratio of $R_L/R_A$ is a constant. This introduces an error in the load sensed by the load cell transducers 78.

To avoid this error an equalizer system is employed which ensures that $R_A$ equals $R_L$ so that the chain 54 hangs symmetrically about sprocket-wheel 58, with each link 54c subtending a predetermined portion of the circumference of the sprocket-wheel 58. It was determined that the aforementioned symmetry is present when the relative geometry of the sprocket-wheel 58 and the chain 54 is defined as follows:

(2) $\theta = 180°/2n$ where $\theta$ is the half angle, measured between two radii extending from the axis 65, that is subtended by centers 59a and 59b. The variable n is an integer. Thus, the equalizer system would include providing the chain 54 and the sprocket-wheel 58 with the physical characteristics so that equation (2) is satisfied. This abrogates measurement errors in the load cell transducers by ensuring the force present on the anchor system portion 54a is substantially similar to the force on the load portion 54b.

Referring to FIGS. 1 and 5, in an alternative embodiment, the equalizer system may be abrogated by taking advantage of the cyclical nature of the aforementioned error. That is, the measurement $R_A$ or $R_L$ is a constant for every $2\theta$ angles of rotation of the sprocket-wheel about axis 65. Specifically, for every $2\theta$ angle of rotation of sprocket-wheel 58, the following may be shown:

$$\frac{\int_0^{2\theta} R_A d\theta}{2\theta} = \frac{R_M + R_N}{2} \; ; \text{and} \quad (3)$$

$$\frac{\int_0^{2\theta} R_L d\theta}{2\theta} = \frac{R_M + R_N}{2} \quad (4)$$

Based upon equations (3) and (4), by substitution, equation (1) effectively becomes:

(5) $2F_{ANCHOR} = 2F_{LOAD}(R_M + R_N)/(R_M + R_N)$ where $R_M$ and $R_N$ are defined above. Thus, by calculating the average load sensed by the load cell transducers during the movement of sprocket-wheel through angular movement equal to multiples of $2\theta$, an accurate measurement of the load on carriage 38 may be determined.

One manner in which to sense the rotational movement of the sprocket-wheel 58 is to provide indicia 63 upon sprocket-wheel 58 demarking increments of $2\theta$. A detector could be positioned to sense to indicia 63. However, it is preferred to observe the relative movement between the top mast section 24 and the bottom mast section 14. Specifically, the angular movement of $2\theta$ in the sprocket-wheel 58 corresponds to 2P of movement of the carriage in a direction parallel to gravity, where P is the pitch defined by each link of the chain 54. By detecting the relative movement between the mast sections 14 and 24, the rotational movement of the sprocket-wheel 58 may be sensed. One manner in which to detect 2P of relative movement is to attach a proximity sensor to one of the mast sections 14 or 24 so as to be in data communication with the remaining mast section 14 or 24.

Referring to FIGS. 1 and 2, in one embodiment, the proximity sensor is an optical detector 67 attached to the lower mast portion 14, to be selectively placed in data communication with an optically responsive strip 69 attached to the carriage 38. The strip 69 is chosen so that it has a length l equal to multiples of 2P. For example, the length l may be equal to 2P, 4P, 6P, etc. The strip 69 is attached to platelike member 40 so that its longitudinal axis extends parallel to axis 22. In this fashion, load measurements could occur during movement of the sprocket-wheel through angles 20, 40, 60, etc. Although any type of detector may be used, it is preferred that detector 67 is a photoelectric sensor sold by Honeywell, Freeport, Illinois, under catalog number CP18LDNL2. Similarly, any type of optically responsive strip may be employed, however, it is preferred that optically responsive strip 69 is reflective sheeting manufactured by the 3M Company, St. Paul, Minn. and sold under the catalog number 580-10.

An important consideration in obtaining accurate measurements is sensing the load while the carriage 38 travels at a constant rate. To that end, the sensor 69 is positioned to sense the strip at a point about 12 to 15 inches from the base member 20. At this point, the acceleration of the carriage 38 has ceased. Although detector 67 has been described as employing a photoelectric detector, the detector 67 may include a magnetic sensor, such as the type sold by Honeywell, Freeport, Illinois, under the designation SR3 series. As a result, strip 69 comprises of a magnetic stripping.

Referring to FIGS. 3, 6A, 6B and 6C, typically load cell transducers 78 and 80 each includes a wire 90 that has a circular cross-section disposed radially symmetric about a neutral axis 92. The wire 90 is helically wound to form a spring 94. The neutral axis 92 defines upper and lower sections 90a and 90b of the wire 90. The spring 94 has an inner diameter 96 and an outer diameter 98. Attached to the wire 90 are two sets 100 and 102 of strain-gauge elements 104. Typically, the strain-gauge elements 104 are attached to the wire 90 using a suitable adhesive. The spring 94 and straingauge elements 104 may be coated with a rubberized coating. For additional protection from the ambient environment, a sheath may be placed over the transducers 78 and 80.

Each of the strain-gauge elements 104 includes a plurality of parallel and spaced-apart grid elements 106 that are symmetrically disposed about the neutral axis 92 and form a 45° angle therewith. By being symmetrically disposed about the neutral axis 92, the area of grid elements 106 that lie within the upper section 90a is substantially identical to the area of the grid elements 106 that lie in the lower section 90b. Each strain-gauge element 104 of set 100 is orientated in an opposite direction with respect to the remaining straingauge element 104, thereby placing the grid elements 106 of the two strain-gauge elements 104 of set 100 at a 90° angle. Similarly, each strain-gauge element of set 102 is orientated in an opposite direction, placing the grid elements of the two strain-gauge elements of set 102 at a 90° angle. In this fashion, one of the strain-gauge elements 104 associated with each set 100 and 102 measures compression on the surface of the wire 90, while the remaining strain-gauge element 104 measures tension.

Preferably, the two sets 100 and 102 of strain-gauge elements 104 are disposed on the wire 90 so as to be in substantially opposing relation at opposite sides of the outer diameter 98 of the spring 94. It is possible to mount the strain-gauge elements 104 at the opposing ends of the inner diameter 96. Were the two sets 100 and 102 of strain-gauge elements 104 disposed at opposite sides of the inner diameter 96, the load cells 78 and 80 would have higher resolution. However, this configuration renders the strain-gauge elements 104 more susceptible to damage compared to mounting the strain-gauge elements 104 at the opposing sides of the outer diameter 98. The shanks of the eye bolts 66 and 68 may impact with the strain-gauge elements 104. With either of the aforementioned mounting schemes, the load sensed by the load cell transducers 78 and 80 is substantially independent of the position of the load on the cell.

Specifically, were spring 94 subjected to force $\vec{F}$, the total force sensed by set 100, "$t_{100}$" would be defined as follows:

$$(6) t_{100} = \vec{F}/A - \vec{F} ra/J$$

where the term $\vec{F}/A$ is defined as the shear stress, with A being the cross-sectional area of the wire 90. The term $\vec{F}ra$ is the torsional stress "T", with "a" being the distance, along the y-axis, from the neutral axis 92 at the cleaved end 108 of the spring 94 at which the force $\vec{F}$ is applied. The variable "r" is the radius of the wire 90 and the variable "J" is the moment of inertia of the wire 90. The term $\vec{F}C$ is the bending stress perpendicular to the neutral axis 92, with the variable "c" being the distance, along the x-axis, between the applied force $\vec{F}$ and the neutral axis 41 at the cleaved end 108.

In a similar fashion, the total force sensed by set 102 "$t_{102}$" is defined as follows:

$$(7) t_{102} = \vec{F}/A - \vec{F} rb/J$$

with only the torsion stress term being different. In set 102, the torsional term is a function of the variable "b" which is, along the y-axis, between the applied force $\vec{F}$ and the neutral axis 92 at the cleaved end 108.

Summing equations (1) and (2), it is shown that the total force "T" sensed by sets 100 and 102 is as follows:

$$(8) T = t_{100} + t_{102} = 2\vec{F}/A - \vec{F} r/J(a+b)$$

With sets 100 and 102 mounted on opposite sides of the outer diameter 98, the term (a+b), in equation (8), is equal to a spring width "W", as measured between the neutral axis 92 of opposing segments of wire 90 and parallel to the outer diameter 98.

In this fashion, equation (8) shows that the force sensed by the load cell transducers 78 and 80 is independent of the position of the load on the cell. This can prove beneficial. Flexure in the support chains 54 and 56, as well as mechanical wear in the parts of the fork-lift truck 10, often causes the force $\vec{F}$ impinge upon the load cell transducers 78 and 80 at different spatial positions. By having the force $\vec{F}$ sensed by the load cell transducers 78 and 80 independent of the position of the load thereon, measurement errors are reduced.

Strain-gauge elements 104 may be placed at the apex 90c, of the upper section 90a, and the nadir 90d, of the lower section 90b. This renders the strain-gauge elements 104 insensitive to shear stresses in the wire 90, thereby nulling the shear stress term in equation (4), $2\vec{F}/A$. However, the strain-gauge elements 104 could be susceptible to total failure were the spring 94 to reach maximum compression. Stops could be implemented to avoid this situation.

Referring to FIGS. 1 and 7, each strain-gauge element is connected by a respective gauge lead 110 to a device for determining the value of a force, and generating a signal corresponding thereto, which is sensed by the strain-gauge elements. The aforementioned device may take the form of a wheatstone bridge 112 which includes a plurality of resistance branches 114. Preferably, the bridge 112 includes four resistance branches 114. Each of the resistance branches 114 is formed from one of the strain-gauge elements.

To further reduce the measurement error in the load cell transducers 78 and 80, each strain-gauge element of set 100 is connected to be electronically adjacent to the remaining strain-gauge element in the set 100. Further, each strain-gauge element of set 102 is connected to be electronically adjacent to the remaining strain-gauge element in the set 102. To that end, set 100 includes strain-gauge elements 100a and 100b with one end of strain-gauge elements 100a and 100b connected in common at node 116. Set 102 includes strain-gauge elements 102a and 102b with one end of strain-gauge elements 102a and 102b connected in common at node 118. The remaining ends of strain-gauge elements 100a and 102b are connected in common to a supply voltage $V_{SUPPLY}$. The remaining ends of strain-gauge elements 100b and 102a are connected in common to ground.

In this arrangement, were strain-gauge elements 100a and 102b sensing tensional stresses, strain-gauge elements 100b and 102b would be sensing compressional stresses. Conversely, were strain-gauge elements 100a and 102a sensing compressional stresses, strain-gauge elements 100b and 102b would be sensing tensional stresses. The voltage output is measured across nodes 116 and 118 as $V^-_{OUT}$ and $V^+_{OUT}$ respectively, and transmitted to processing circuitry where information regarding the load on the fork B is generated. The sensor 69 is coupled to the processing circuitry 120 and gates the processing circuitry so that load measurements are accumulated for a predetermined amount of rotational movement of sprocketwheel 58. The information generated is then supplied to either an analog or digital visual display 122.

In operation, the piston 32 raises carriage 38. As the proximity detector 67 passes strip 69, it impinges a beam thereupon which is reflected back to the sensor 69. So long as the detector 67 senses the beam, the proximity sensor 71 transmits a signal to the processing circuity 120, allowing the same to accumulate data samples corresponding to the load sensed. After the detector 67 has passed strip 69, the beam is no longer detected thereby, causing the proximity sensor to cease the accumulation of data by the processing circuitry 120. The processing circuitry 120 creates a data stream from the load data, with each of the data samples being associated with a unique increment of the stream. The data samples are then summed and the average load sensed is calculated. The weight of the load is made visible of the visual display 122.

Referring to FIGS. 3, 8A and 8B, although the load cell transducers 78 and 80 have been described as employing a compressive load cell formed with a helical wire, any load cell may be employed. For example, the load cell transducers may include a generally spool-shaped body 200 having a central cylindrical portion 202 disposed between end portion 204 and 206. Each of the end portions 204 and 206 are a greater diameter than that of the central portion 202. An axial bore 208 has a diameter such that the shank of eye-bolts 66 and 68 may pass freely therethrough. There is at least one resistive strain-gauge element affixed to the outer surface of portion 202 such that the element is responsive to compressive forces applied between the end surfaces 206 and 208 of the load cell transducer. Preferably, two strain-gauge elements 210 and 212 are affixed symmetrically to the central portion 202 so as to be responsive to compressive forces. Two further elements 214 and 216 are affixed so as to be affected by compressive forces as defined by Poissons ratio. The strain-gauge members 210, 212, 214 and 216 are electrically connected as discussed above with respect to FIG. 7.

In addition, tension load cells may be employed in lieu of compressive load cells. One example of a tension load cell is sold by Industrial Electronic Weighing, Inc., Niles, Ohio, under the tradename Criterion I.

Figure 9:
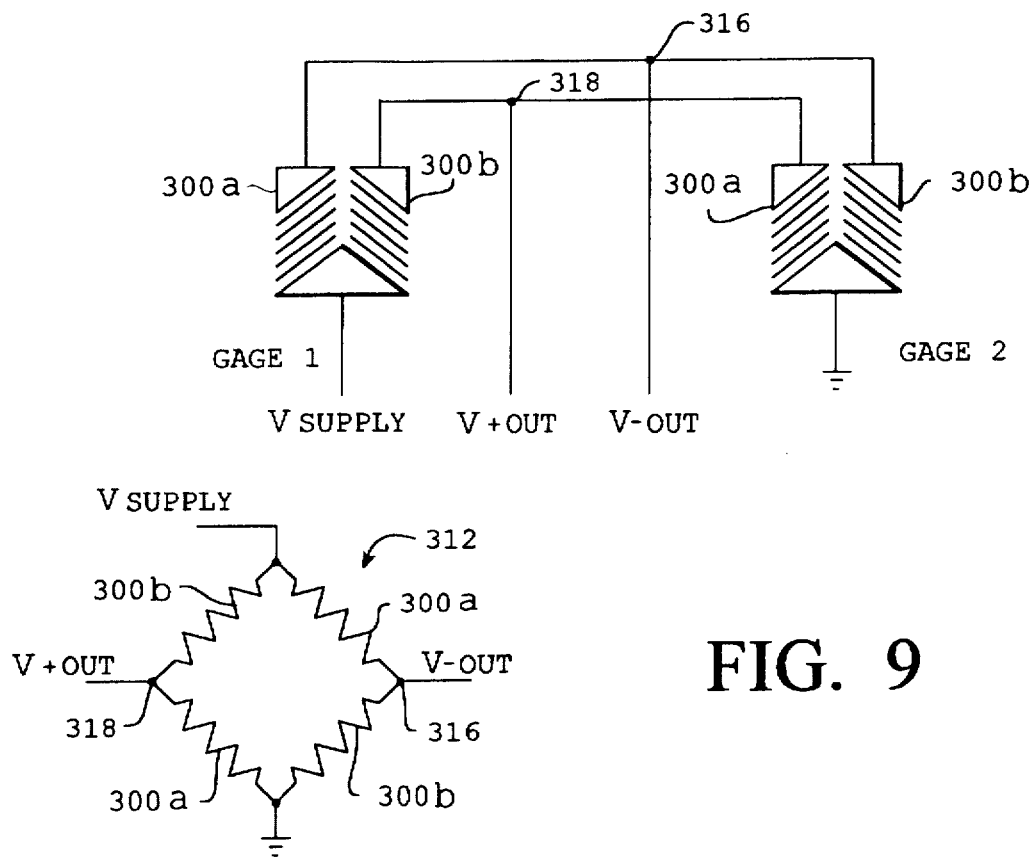
FIG. 9 is a diagram of the electrical connection of strain-gauge elements shown in FIG. 6A, in accord with an alternate embodiment.

Referring to FIG. 9, an alternate construction of the wheatstone bridge 312 is shown with one end of strain-gauge elements 300a and 300b connected in common to $V_{SUPPLY}$, and one end of strain-gauge elements 302a and 302b connected in common to ground. The remaining ends of strain-gauge elements 300a and 302b are connected in common at node 316. The remaining ends of strain-gauge elements 300b and 302a are connected in common to node 318, with the voltage output being measured across nodes 316 and 318 as $V^-_{OUT}$ and $V^+_{OUT}$, respectively.

I claim:

1. A device for lifting a load, said device comprising:

a frame;

a carriage operationally coupled to said frame for movement relative thereto;

a linkage member disposed, relative to said frame, to form two spaced-apart opposing sections, one of which is fixedly secured to said frame, defining an anchor portion, with the remaining section attached to said carriage, defining a load portion, said linkage member having a plurality of links, each link including a pair of spaced apart rollers;

a load bearing member adapted to engage said load, said load bearing member connected to said carriage for movement relative to said frame, exerting a first force on said load portion corresponding to a weight of said load, with said first force producing a second force on said anchor portion;

a load cell transducer coupled to said carriage to sense said second force and produce signals corresponding thereto; and a sprocket wheel attached to said frame to rotate about an axis, with said linkage member passing over said sprocket wheel so that the centers of a pair of spaced apart rollers subtend an angle 2θ measured between two radii extending from said axis, with e being defined as follows: θ=180°/2n.

2. The lifting device as recited in claim 1 wherein said linked member is a link chain having a plurality of links, each of which includes a pair of spaced-apart rollers, and said equalizer system includes a sprocket-wheel attached to said frame to rotate about an axis, with said chain passing over said sprocket-wheel so that the centers of said pair of spaced apart rollers subtend an angle 2θ, measured between two radii extending from said axis, with θ being defined as follows: θ=180°/2n.

3. The lifting device as recited in claim 1 wherein said load cell transducer includes a helical spring having a diameter, with first and second sets of resistive strain-gauge elements disposed thereon in opposing relation at opposite sides of said diameter.

4. The lifting device as recited in claim 3 wherein said helical spring is formed from a wire having a neutral axis with one of the strain-gauge elements of said first and second sets having a plurality of spaced-apart and parallel grid elements each of which forms a 45° angle with said neutral axis.

5. The lifting device as recited in claim 3 wherein said helical spring is formed from a wire having a neutral axis and said first and second sets each comprises of two strain-gauge elements, with each straingauge element of a given set having a plurality of spaced-apart and parallel grid elements orientated to form a 45° angle with said neutral axis and a 90° angle with respect to the remaining strain-gauge member of said given set.

6. The lifting device as recited in claim 3 wherein said helical spring is formed from a wire having a neutral axis with each of the strain-gauge elements of said first and second sets being symmetrically disposed about said neutral axis.

7. The lifting device as recited in claim 3 wherein said first and second sets each comprises of two strain-gauge elements, with the strain-gauge elements of said first and second sets being electronically connected to form a wheatstone bridge having a plurality of resistance bridges, with each of the strain-gauge elements forming one of said plurality of resistance bridges.

8. The lifting device as recited in claim 3 wherein said force produces torsion, compression, tension and axial stresses in said wire, defining a group of stresses and further including means, attached to said helical spring, for sensing one of said stresses of said group while being relatively insensitive to the remaining stresses of said group.

9. A device for lifting a load, said device comprising:

a frame;

a carriage operationally coupled to said frame for movement relative thereto;

a link chain coupled to said frame to form two spaced-apart opposing sections, one of which is fixedly secured to said frame, defining an anchor portion, the remaining section attached to said carriage, defining a load portion, with said load portion being spaced-apart from said axis a first distance and said anchor portion being spaced-apart from said axis a second distance, said link chain having a plurality of links;

a load bearing member adapted to engage said load, said load bearing member connected to said carriage for movement relative to said frame, said load bearing member exerting a first force on said load portion corresponding to a weight of said load, with said first force producing a second force on said anchor portion, said second force being proportional to a ratio of said first and second distances;

a load cell transducer coupled to said carriage to sense said second force and produce signals corresponding thereto; and a sprocket wheel attached to said frame to rotate about an axis;

said sprocket wheel, said links and the spacing between said links having relative dimensions which satisfy the relation 2θ=180°/2n, 2θ being the angle subtended between two lines extending from said axis to the centers of two adjacent links, n being an integer.

10. The lifting device as recited in claim 9 wherein said load cell transducer includes a helical spring having a diameter and first and second sets of resistive strain-gauge elements disposed on said spring in opposing relation at opposite sides of said diameter.

11. The lifting device as recited in claim 10 wherein said helical spring is formed from a wire having a neutral axis with each of said strain-gauge elements symmetrically disposed about said neutral axis.

12. A device for lifting a load, said device comprising:

a frame;

a carriage operationally connected to said frame for movement relative thereto;

a flexible member disposed, relative to said frame, to form two spaced-apart opposing sections, one of which is fixedly secured to said frame, defining an anchor portion, with the remaining section attached to said carriage, defining a load portion;

a load bearing member adapted to support said load, said load bearing member connected to said carriage, with said load bearing member exerting a first force on said load portion corresponding to a weight of said load, with said first force producing a second force on said anchor portion;

a spring formed from a helically wound wire, said wire having a neutral axis, with said spring coupled between said frame and said carriage and adapted to compress in response to said force, thereby producing torsion, compression, tension and axial stresses in said wire, defining a group of stresses;

means, attached to said helical spring, for measuring one of the stresses of said group of stresses while being relatively insensitive to the remaining stresses of said group, said measuring means includes a plurality of strain-gage elements attached to said wire so as to be symmetrically disposed with respect to said neutral axis; and an equalizer system coupled to said frame and adapted to attenuate variances between said first and second forces, thereby ensuring said signal corresponds to said weight.

13. The lifting device as recited in claim 12 wherein said plurality of strain-gauge elements are arranged as first and second sets, each having two strain-gauge elements, with the four strain-gauge elements associated with said first and second sets electronically interconnected to form a wheatstone bridge having a plurality of resistance bridges.

14. The lifting device as recited in claim 13 wherein each of said strain-gauge elements in one of said first and second sets includes a plurality of spaced-apart and parallel grid elements orientated to form a 45° angle with said neutral axis and a 90° angle with respect to the remaining strain-gauge member in said one of said first and second sets.

15. The lifting device as recited in claim 13 wherein said flexible member is a link chain and said equalizer system includes a sprocket-wheel attached to said frame to rotate about an axis, with said chain passing over said sprocket-wheel, said chain having a plurality of links, each of which includes two spaced-apart rollers, the centers of which subtend an angle 2θ with respect to said axis, with θ being defined as follows: θ=180°/2n.

* * * * *

UNITED STATES PATENT AND TRADEMARK OFFICE
CERTIFICATE OF CORRECTION

PATENT NO.  : 5,783,755
DATED       : July 21, 1998
INVENTOR(S) : Robert W. Bruns It is certified that error appears in the above-identified patent and that said Letters Patent is hereby corrected as shown below:

Col. 1, line 40, "weigh-Tronix, Inc." should be -- Weigh-Tronix, Inc. --.

Col. 1, line 42, "weigh-Tronix" should be -- Weigh-Tronix --.

Col. 7, line 51, "450 angle" should be -- 45° angle --.

Claim 1, col. 10, line 54, "with e" should be -- with θ --.

Claim 2, col. 10, line 57, "having a plurality of links, each of which includes a pair of spaced-apart rollers, and said equalizer system includes a sprocket-wheel attached to said frame to rotate about an axis, with said chain passing over said sprocket-wheel so that the centers of said pair of spaced apart rollers subtend an angle 2θ, measured between two radii extending from said axis, with θ being defined as follows: θ = 180°/2n" should be deleted.

Signed and Sealed this

Twenty-ninth Day of September, 1998

Attest:

BRUCE LEHMAN

Attesting Officer

Commissioner of Patents and Trademarks